United States Patent
Shicoff et al.

(10) Patent No.: US 10,163,075 B2
(45) Date of Patent: Dec. 25, 2018

(54) BULK EVENT SCHEDULING

(71) Applicant: PAYPAL, INC., San Jose, CA (US)

(72) Inventors: Rachel Shicoff, Campbell, CA (US); David Edward Eramian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 488 days.

(21) Appl. No.: 14/657,834

(22) Filed: Mar. 13, 2015

(65) Prior Publication Data

US 2016/0267404 A1    Sep. 15, 2016

(51) Int. Cl.
| | | |
|---|---|---|
| *G06Q 10/10* | (2012.01) | |
| *G06Q 10/02* | (2012.01) | |
| *G06Q 50/00* | (2012.01) | |
| *G06Q 10/06* | (2012.01) | |

(52) U.S. Cl.
CPC ....... *G06Q 10/1093* (2013.01); *G06Q 10/025* (2013.01); *G06Q 10/06* (2013.01); *G06Q 10/1095* (2013.01); *G06Q 50/01* (2013.01)

(58) Field of Classification Search
CPC ...... G06Q 10/025; G06Q 50/02; G06Q 50/01; G06Q 10/1093; G06Q 10/06; G06Q 10/1095
USPC .......................................................... 705/6
See application file for complete search history.

(56) References Cited

U.S. PATENT DOCUMENTS

| | | | | |
|---|---|---|---|---|
| 7,693,736 | B1* | 4/2010 | Chu ................... | G06Q 10/1095 |
| | | | | 705/7.19 |
| 2009/0006161 | A1* | 1/2009 | Chen ................... | G06Q 10/109 |
| | | | | 705/7.19 |
| 2014/0052485 | A1† | 2/2014 | Shidfar | |
| 2014/0129505 | A1* | 5/2014 | Lin ....................... | G06Q 50/01 |
| | | | | 706/50 |
| 2015/0039368 | A1† | 2/2015 | Polyakov | |

OTHER PUBLICATIONS

Tsuruta, Takuo, and Toramatsu Shintani. "Scheduling meetings using distributed valued constraint satisfaction algorithm." Proceedings of the 14th European Conference on Artificial Intelligence. IOS Press, 2000. (Year: 2000).*

\* cited by examiner
† cited by third party

*Primary Examiner* — Kevin H Flynn
*Assistant Examiner* — Emmett K. Walsh
(74) *Attorney, Agent, or Firm* — Haynes and Boone, LLP

(57) ABSTRACT

A system can provide for scheduling of a collection of events for a user of the system by including a non-transitory memory storing user information comprising schedule information for a plurality of users and including a hardware processor in communication with the non-transitory memory. The hardware processor accesses schedule information of a first user of the plurality of users and accesses schedule information for a subset of users of the plurality of users, each of the subset of users being associated with the first user. The processor also receives selections from the first user regarding at least two events and determines events from a plurality of potential events that satisfy the selections and that optimize potential participation of the subset of users associated with the first user.

20 Claims, 7 Drawing Sheets

| User Schedule 400 | | | | |
|---|---|---|---|---|
| Date | Time | Duration | Description | Priority |
| 2015-02-28 | 14:30:00 | 00:30:00 | Status Meeting for Project Game-Changer | 1 |
| 2015-03-07 | 08:00:00 | 4:00:00 | Kayaking in the Bay with Chuck | NA |
| 2015-03-14 | 10:47:00 | 05:23:00 | Flight to Boston for St. Paddy's Day | 2 |

| Venue Schedule 450 | | | | | |
|---|---|---|---|---|---|
| Date | Start Time | End Time | Description | Category | Genre |
| 2015-02-28 | 16:00:00 | 21:00:00 | Miami Heat vs. LA Lakers | Athletics | Basketball |
| 2015-03-08 | 20:00:00 | 23:59:59 | Big Band | Music | Pop |
| 2015-03-14 | 10:47:00 | 02:59:59 | Bigger Band | Music | Pop |

BULK EVENT SCHEDULING

TECHNICAL FIELD

The present disclosure relates generally to electronic commerce, and more particularly, to the buying and selling of admission to a collection or series of events and to the scheduling of such a collection or series of events.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics.

One example of a market for goods within the realm of electronic commerce is the online ticket market. Various online ticket sellers provide websites and/or applications through which parties can buy and sell tickets online. These tickets can be obtained by a user to reserve seats and/or admission for a variety of events, such as sporting events, concerts, theater events, and other entertainment events. Typically, a buyer looks for available tickets on a ticket marketplace website or other online listing and decides which, if any, of the available tickets are of interest to the buyer for possible purchase.

Computer systems and networks have also facilitated the scheduling of events such as ticketed events and work meetings. In some instances, a buyer may want to attend multiple events with several different people. Synchronizing all of the schedules of a group of people for a single event may be complicated, and synchronizing all the schedules of that group of people for multiple events is even more complicated.

BRIEF DESCRIPTION OF THE DRAWINGS

FIG. 4A is a diagram of an exemplary user schedule as stored in memory according to an embodiment.

FIG. 4B is a diagram of an exemplary venue schedule as stored in memory according to an embodiment.

Figure 1:
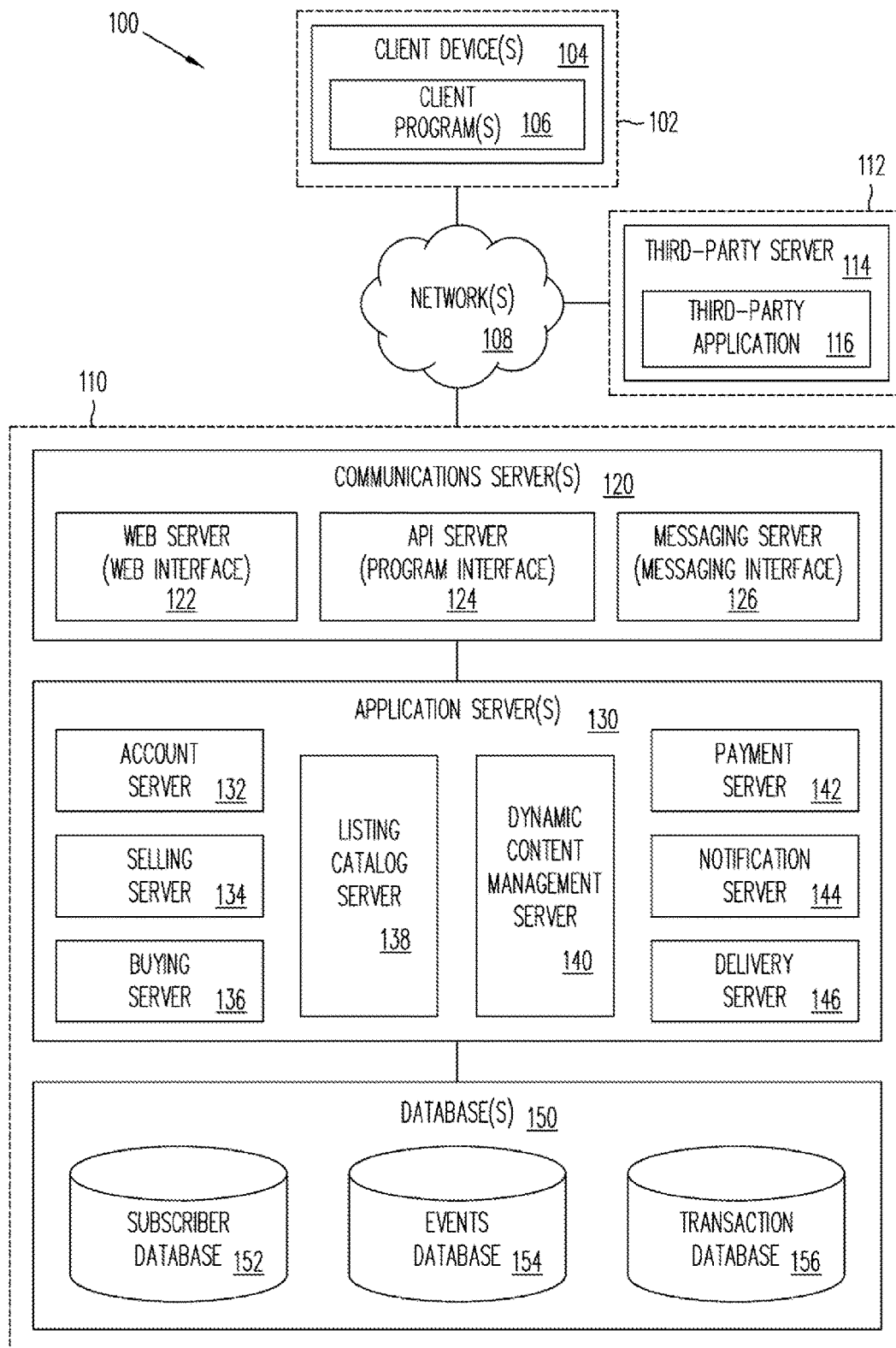
FIG. 1 is a block diagram of an illustrative computing system that is adapted for implementing the simultaneously scheduling of multiple events according to an embodiment.

These drawings will be better understood by those of ordinary skill in the art by reference to the following detailed description.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to the identification, presentation, and selection of multiple events to be attended by a group or by groups of people. The devices, systems, and methods are also provided for performing activities related to the online sale, purchase, and resale of tickets to ticketed events or for unticketed reservations, such as dinner reservations, that are included in the selected multiple events. In various particular embodiments, the devices, systems or methods involve one or more devices in communication over a network. Such devices, systems, and methods can facilitate the identification of a collection of events that best satisfy the scheduling requirement of a group or groups of people. In certain embodiments, the scheduling requirements may be accessed by a scheduling server which is able to receive schedule information for each of the users in the group. Tickets for the collection of events may then be purchased by communication with a ticketing server.

In various embodiments, a system may include a non-transitory memory storing user information having schedule information for a plurality of users and one or more hardware processors in communication with the non-transitory memory. The system may be configured to access schedule information of a first user of the plurality of users and for a subset of users of the plurality of users. Each user of the subset of users may be associated with the first user. For example, the first user may designate certain users of the plurality of users as contacts, friends, etc. The system may receive a selection from the first user identifying a period of time during which the first user wants to attend a collection of events with the subset of users or with different subsets within the subset of users (e.g., different groups of contacts) and then determine events from a plurality of potential events that optimize potential participation of the people in the subset(s). The system may optimize potential participation of the subset of users by determining the collection of events that enables the most members of the subset of users to attend and/or by determining which collection of events would result in the fewer number of scheduling conflicts for the potential attendees in the subset of users.

While the various examples disclosed herein focus on particular aspects regarding the scheduling of multiple individuals and/or groups of individuals and multiple events, it will be understood that the various inventive principles and embodiments disclosed herein can be applied to other types of scheduling applications and arrangements as well. For example, work-related meetings may be scheduled using similar principles and embodiments. Work-related meetings and dinner reservations may be considered as different categories of unticketed events, i.e., events that a user may want to schedule but that do not require that the user "hold" a ticket, virtually or physically, to attend. Users schedules may include ticketed and unticketed events that should be considered when scheduling subsequent events Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these words are not necessarily all referring to the same embodiment. Furthermore, the particular features, structures or characteristics may be combined in any suitable manner in one or more embodiments.

According to some embodiments, a computer program product can comprise a non-transitory machine-readable medium. The non-transitory machine readable medium can store computer-readable and executable code for instructing one or more processing devices to perform any of the methods or features disclosed herein.

Beginning with FIG. 1, an exemplary embodiment of a computing system adapted for implementing the selection and purchase of tickets for ticketed events and/or scheduling for ticketed events and/or unticketed registrations is illustrated in block diagram format. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a personal computer, a laptop, a mobile-computing device, such as tablet computer, a wearable computing device, and/or any other computing device having computing and/or communications capabilities in accordance with the described embodiments. In particular, it is specifically contemplated that client devices 104 can include a smartphone or other similar mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., iOS®, Android® OS, LINUX® OS, Firefox OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts applications, calendar applications that include schedule information such as appointments, meetings, events, etc., electronic document applications, database applications, media applications (e.g., music, video, television), location-based services (LBS) applications (e.g., GPS, mapping, directions, point-of-interest, locator), and so forth. One or more of client programs 106 may display various graphical user interfaces (GUIs) to present information to and/or receive information from respective users of the one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various client devices 104 and/or client programs 106. Accordingly, a communications session between client 102 and network-based system 110 (e.g., a communications session for scheduling two or more events such as ticketed events or unticketed events) may involve the unidirectional and/or bidirectional exchange of information and may occur over one or more types of networks 108 depending on the mode of communication. While the illustrated embodiment of FIG. 1 depicts a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site or an application or via an e-mail, IM session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

In various embodiments, computing system 100 can include, among other elements, one or more third parties 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide client 102 with additional services and/or information, such as ticket inventory, event schedules and descriptions, and schedules of users with linked accounts, e.g. a user having an account associated with the network-based system 110 who has given the network-based system 110 access to information stored on the third-party server 114 in connection with an account of the user on the third-party server 114. Third-party server 114 and/or third-party application 116 may provide system 110 and/or client 102 with email services and/or information, calendar/scheduling services and/or information, social networking services and/or information, travel services and/or information, purchase services and/or information, or other online services and/or information.

In one embodiment, third party server 112 may include a social networking server that hosts a user's social network account. In another embodiment, third party server 112 may include an email server that hosts a user's email account or a calendar or schedule server that hosts a user's calendar or schedule. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplaces, ticket fulfillment services, and/or scheduling services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

In some embodiments, application servers 130 of network-based system 110 may provide various online marketplace and ticket fulfillment services including, for example, account services, buying services, selling services, listing catalog services, delivery services, payment services, gathering services, scheduling services, and notification services. Application servers 130 may include an account server 132, a selling server 134, a buying server 136, a schedule server 138, a dynamic content management server 140, a payment server 142, a notification server 144, and/or a delivery server 146 structured and arranged to provide such online marketplace and ticket fulfillment and/or redistribution services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
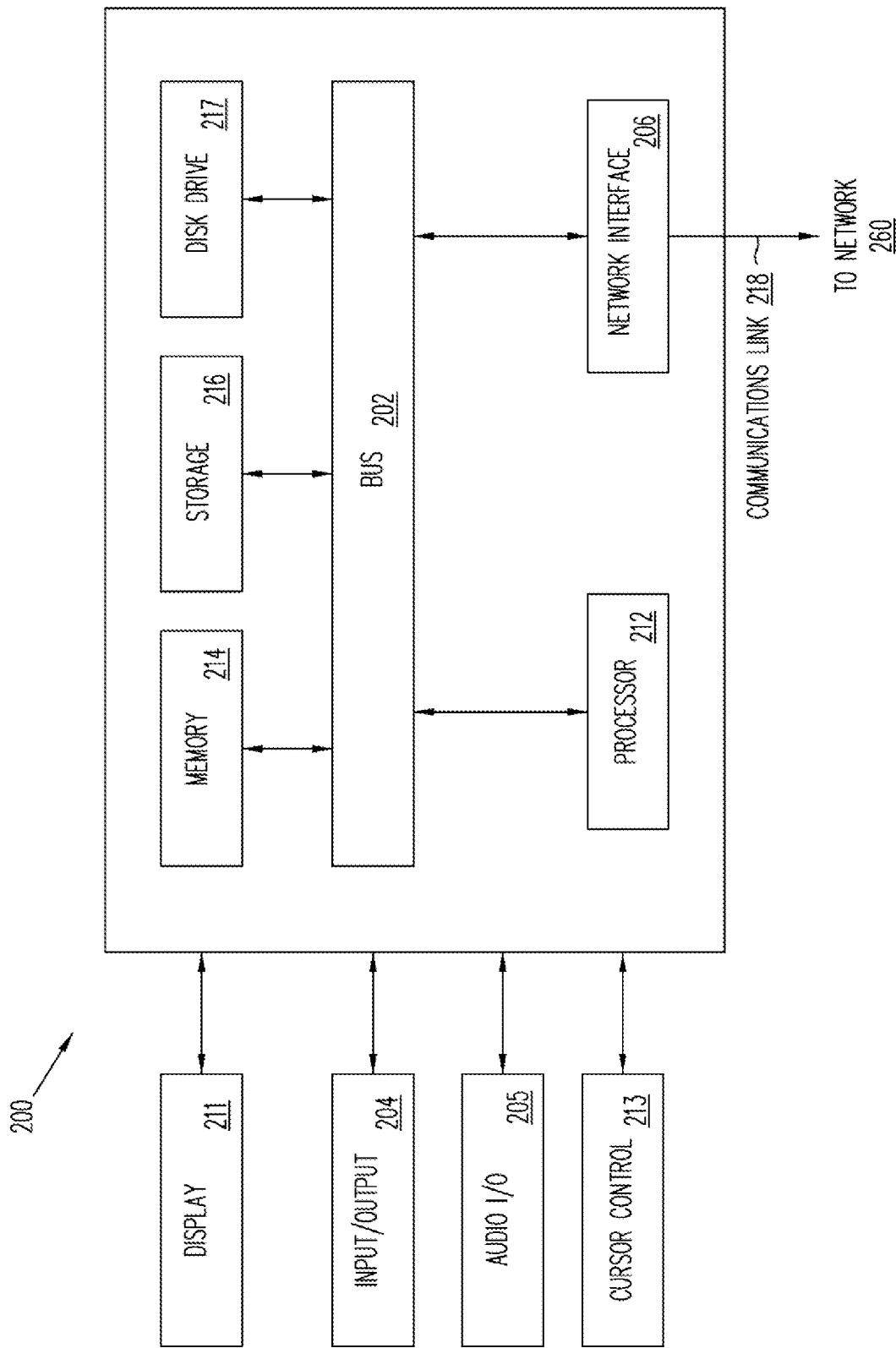
FIG. 2 is a block diagram of an illustrative computer system suitable for implementing on one or more devices of the computing system in FIG. 1 according to an embodiment

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smartphone, a computing tablet, a personal computer, laptop, PDA, Bluetooth device, key FOB, badge, etc.) that is capable of communicating with a network. The ticket provider and/or a scheduling-services provider may utilize a network computing device (e.g., a network server) capable of communicating with the network. It should be appreciated that each of the devices utilized by users, ticket providers, and scheduling providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, touchscreen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, a venue server, an email server, a calendar or schedule server, a social networking server, other third-party servers, and/or a payment provider server via a network. In various embodiments, such as for many cellular telephone and other mobile device embodiments, this transmission can be wireless, although other transmission mediums and methods may also be suitable. A processing device or processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer-readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory machine-readable medium. In one example, transmission media may take the form of acoustic or light waves, such as those generated during radio wave, optical, and infrared data communications.

Some common forms of computer-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein can be embodied in one or more computer-readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof can be used to implement a bulk event scheduling operation to enable users to simultaneously schedule multiple events, factoring in the availability or potential participation of those that the user wants to attend and factoring in preferences for types of events, a selection of a specific event, etc.

Figure 3:
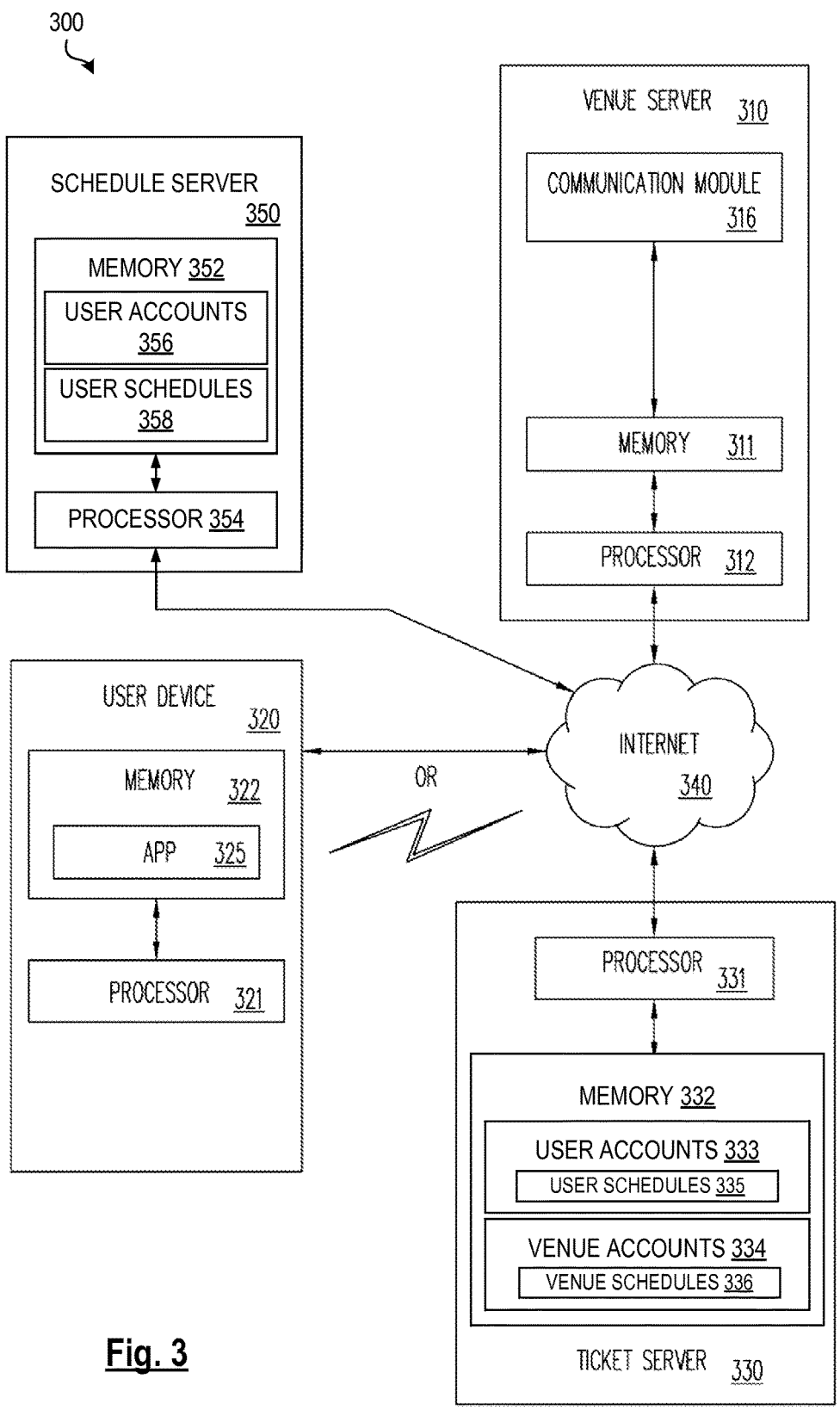
FIG. 3 is a block diagram of an illustrative system for facilitating scheduling of multiple events according to an embodiment.

FIG. 3 is a block diagram showing a ticket selection and purchase system 300 that may be used to receive and use schedule information for a user and selected contacts of that user, according to an embodiment. The contacts selected by that user include a subset of the all the users of the ticket selection and purchase system 300. As shown in FIG. 3, a ticket server 330 may be in communication with one or more user devices such as user device 320, one or more venue devices such as venue server 310, and one or more schedule servers such as the schedule server 350 to access schedule information and determine an optimal event schedule for the user and the selected contacts of the user. The venue server 310 may be associated with an event venue, which may be any venue for which an attendee can purchase access (e.g., ticketed access) to particular locations or portions within the venue for a period of time. Without being limiting, examples of event venues may include a stadium, a theater, an arena, an amphitheater, an airplane, a train, a hotel, or any another venue into which an attendee can purchase access or which has scheduled events.

In some embodiments, a venue device such as a venue server 310 (sometimes referred to herein as a venue device or a venue system) can be present at each of a plurality of different event venues (e.g., stadiums, theaters, arenas, amphitheaters, airplanes, cruise ships, hotels, or other venues at which ticketed events are held or for which access to restricted portions of the venue can be purchased for a period of time). Venue server 310 can provide information regarding events scheduled to occur at a particular venue and regarding seating and/or other accommodations (e.g., hotel rooms, cruise ship cabins, etc.) at that venue. In some embodiments, venue server 310 can provide the information to ticker server 330. Ticket server 330 can obtain information regarding events scheduled to occur at various venues and information regarding seating, ticket availability and pricing for each event, and/or other accommodations at the various venues from one or more venue devices (servers) 310, from other sources, or ticket server 330 may have a database of event information and venue information independent of any interaction with a venue device. Ticket server 330 may, for example, be an implementation of system 110 of FIG. 1.

Venue server 310 can be a system that includes one or more computers, one or more servers, one or more computing tablets, one or more mobile devices, communications equipment, wireless transmitters or beacons and/or other suitable computing equipment, as examples. Venue server 310 has a processing device such as a processor 312 and storage such as a memory 311, in which schedule information is may be stored for the venue. The schedule information may describe events that have been held at the venue and events that are scheduled to be held at the venue. In some embodiments, the schedule information stored on the venue server 310 may include a date and time of the event, a type of the event (e.g., movie, theatrical performance, musical performance, athletic event, a comedy performance, etc.) and genre of the event (e.g., classical music, rock music, electronic music, etc.). The venue server 310 may also have ticket availability information stored in the memory 311, which may be exchanged with the ticket server 330 to facilitate the sale and purchase of tickets for the events. Venue device 310 may, according to some embodiments include communications equipment such as communications module 316.

Processor 312 can execute a software program stored in memory 311 for providing information regarding events scheduled to be at the venue, regarding seating at the venue, regarding user locations at the venue, or other information for each scheduled or ongoing event to be communicated to another device. Venue server 310 can provide the information to the ticket server and/or to a user device such as user device 320 by the communications module 316. Communication module 316 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Venue server or device 310 can be disposed at the venue. However, this is merely illustrative. If desired, venue device 310 can be disposed at a location other than the venue. Each venue can have a dedicated venue device 310 or a plurality of different venues can share a common venue device 310. For example, co-owned venues can share a common venue device 310.

In some embodiments, venue device 310 can be omitted if ticket server 330 has the information needed for buying and selling of tickets and/or providing venue schedule information. For example, ticket server 330 may have a database of available tickets for a plurality of events for a plurality of venues and information about the tickets (e.g., price, seating location, etc.) and venues that enables ticket server 330 to provide the necessary information to a user that is trying to schedule multiple events during a given period of time.

Schedule servers such the schedule server 350 may include, for example, a social media server that hosts one or more social networking accounts (e.g., a social networking account for a user of user device 320), an email server that hosts email services (e.g., an email account for the user), a calendar server that hosts calendar and scheduling services (e.g., one or more calendar accounts for the user or a calendar account associated with an user account of the server, and/or a travel services server). In some embodiments, schedule server 350 includes memory 352 storing data related to user accounts 356 and data related to user schedules 358. Schedule server 350 may also include one or more processors 354 configured to perform functions described herein. The schedule server 350 may be operated by an entity that is different than the entity that operates the ticket server 330, i.e. the schedule server 350 may be a third-party server. In some embodiments, many schedule servers 350 may be included in the ticket selection and purchase system 300. For example, a user of the ticket server 330 may have multiple calendar accounts provided by multiple scheduling servers, such as a MICROSOFT® EXCHANGE® server for work, a GOOGLE® calendar server for calendar account used to schedule personal events, and another calendar server providing another calendar account for the user's work with a community services non-profit.

In some embodiments, the schedule server 350 or a plurality of schedule servers may communicate with one or more applications running on the user device, such as the app 325 to receive schedule information for the user. For example, the user device 320 may be a smartphone belonging to a first user. The first user may have schedule information stored in the memory 322. For example, the app 325 may be a calendar app 325. Schedule information may be added by the first user to the app 325, which then transmits the schedule information to the schedule server 350. Additionally, a calendar server may provide schedule information to the app 325 over the internet 340. Calendar servers such as a MICROSOFT® EXCHANGE® server may add appointments and meetings from the first user's work schedule to the app 325. Other servers, such as a push notification server, may be used to push schedule items to the app 325; invitations may be sent to the first user and accepted via the app 325, etc. Similarly, the schedule server 350 may include schedule information from a plurality of different sources associated with each user.

Accordingly, in some embodiments, the schedule server 350 may push schedule information to the user device 320; while in other embodiments, the schedule information is sent by the user device 320 to the schedule server 350. In other embodiments, schedule information for the first user may be exchanged between the schedule server 350 and the user device 320 such that the schedule information on both the schedule server 350 and the user device 320 are synchronized. In some embodiments, the schedule information may be synchronized by passing information through the ticket server 330, such as by providing the schedule information to and accessing the schedule information from the user account 333 associated with the first user.

To facilitate scheduling of multiple events, a user may interact with the user device 320 to access a calendar site that is hosted by one of servers 350, to send, store, and receive emails and process schedule invitation or other electronic communications on an email account that is hosted by one of servers 350, to schedule meetings and appointments, and/or access other services on one of servers 350. For example, the server 350 may be a server for Gmail®, Yahoo®, or another server than provides calendaring and scheduling and may provide other services. The user may also interact with the user device 320 to access ticket server 330 to identify a collection of events for one or more groups of contacts and/or select and purchase tickets for the collection of events from ticket server 330 (as examples).

The user may provide the ticket server 330 with access to the schedule information stored in the memory 322 of the user device 320. For example, the user may grant permission to an app configured to interface with the ticket server 330 to access the schedule information associated with the calendar app 325. Additionally, the user may grant access to the ticket server 330 to access information on the schedule server 350. For example, the user may provide login information for the schedule server 350 to the ticket server 330. The ticket server 330 may then use the login information of the user to log into the schedule server 350 to access an account of the user in the user accounts 356. The ticket server 330 can then obtain schedule information for the user from the user schedules 358. Multiple users may grant access to their respective devices and to accounts on third-party servers, such as the schedule server 350, to facilitate scheduling of events.

A user (e.g., an event attendee that attempting to schedule multiple events) can use a device such as user device 320 to shop online for available tickets associated with one or more events. User device 320 can be a mobile device such as a cellular telephone or smartphone, a tablet computer, a laptop computer, or another portable computing device. User device 320 can be a non-mobile device such as a desktop computer, an interactive set top box, or the like. User device 320 can be any device or combination of devices that facilitate online ticket viewing, selection, and/or purchasing for multiple events. User device 320 may, for example, be an implementation of client device 104 of FIG. 1.

User device 320 can have a processor 321, a memory 322, a global positioning system component (GPS) 323 and/or other suitable device components. Processor 321 can execute an application such as the app 325. The processor 321 may execute a plurality of applications, such as a scheduling or calendar app and another app that facilitates the ticket selection, purchase, and/or bulk event scheduling processes disclosed herein. App 325 can be stored in a memory 322. App 325 can provide a graphical user interface (GUI) for the user when the user is selecting and purchasing tickets online and when scheduling multiple events. If desired, app 325 can be a dedicated ticket purchasing app. However, this is merely illustrative. In some configurations, app 325 can be part of another app, such as a PayPal, Inc. payment provider app. User device 320 may be able communicate with venue device 310, schedule server 350, and/or ticket server 330 via a network such as the Internet 340. User device 320 can communicate with the Internet via either a wired connection or a wireless connection.

Ticket server 330 may be operated by an online ticket seller such as StubHub, Inc. As described elsewhere herein, ticket server 330 can facilitate online ticket sales and/or scheduling of multiple events during a given time period. Ticket server 330 may include processing circuitry such as a processor 331 in communication with storage such as a memory 332. Processor 331 can include one or more processors. Processor 331 accesses accounts such as one or more of the user accounts 333 and/or venue accounts 334 that are stored in memory 332. User accounts 333 can include information regarding the users (e.g., identification information, preferences, account numbers, purchase history, social network contacts, email contacts, contacts stored on user devices, email account permissions, social media account permissions, calendar account permissions, purchased-ticket event information, attended event information, etc.). Venue accounts 334 can include information regarding the venues (e.g., information regarding events, event availability, seating, venue location, and other venue features). Memory 332 can be separate from the ticket server and can be used to store any number of user accounts 333 and venue accounts 334. Memory 332 can be distributed, e.g., have portions thereof disposed at a plurality of different locations. Other accounts may also be accessible by processor 331, such as accounts of users selling tickets that include ticket details, such as price, quantity, location, and event information, and financial information that enable funds to be deposited into seller accounts when their tickets are sold.

Ticket server 330 may include one or more servers located at one or more locations. Thus, the ticket server 330 can be geographically and operationally distributed if desired. Ticket server 330 can be part of another system, such as a payment provider system. Venue device 310 and/or schedule server 350 can communicate with ticket server 330 over a wired or wireless connection such as via a network such as Internet 340. Venue device 310 and/or schedule server 350 can communicate with a plurality of different ticket servers 330. Ticket server 330 can communicate with a plurality of different venue devices 310 and/or schedule servers 350. A plurality of different ticket servers 330 can communicate among themselves and can be considered herein as being the same as a single ticket server 330. The user can operate user device 320 to interact with ticket server 330 so that the user can select, purchase, and/or sell tickets and/or view and/or schedule multiple events for multiple groups online.

Ticket server 330 can communicate with venue device 310 to obtain information about the venue. For example, ticket server 330 can communicate with venue device 310 to obtain information regarding the scheduling of events at the venue and regarding features of the venue. The features of the venue can be dependent upon the events of the venue, e.g., the features of the venue can vary from event to event, such that seating at a venue can be different from one event to the next. Generally, venue device 310, mobile device 320, schedule server 350, and ticket server 330 can perform functions discussed herein. That is, at least to some extent, a function that is discussed herein as being performed via a particular one of these devices can be performed by a different one of these devices, by a combination of these devices, and/or by other devices. In some embodiments, the ticket server 330 retrieves schedule information from the schedule server 350 in order to find a collection of optimal events for a group of users or for several groups of users. In another embodiment, the determination of the optimal events may be performed by the schedule server 350.

Venue device 310, user device 320, schedule server 350, other mobile devices, and ticket server 330 can communicate with one another via a network, such as the Internet 340 or with one another via one or more networks, such as local area networks (LANs), wide area networks (WANs), cellular telephone networks, and the like. Venue device 310, mobile devices such as user device 320, schedule server 350, ticket server 330, and other devices can communicate with one another, at least partially, via one or more near field communications (NFC) methods or other short range communications methods, such as infrared (IR), Bluetooth, WiFi, and WiMax.

When a user wishes to shop for tickets online, resell tickets online, check into a venue such as an event venue online, access electronic tickets online (as examples), the user can access an online ticket seller's website or can access the ticket seller using an application such as app 325. The user can open the ticket seller's website using a web browser executing on the user device 320, for example. The ticket seller's website can be hosted on ticket server 330, venue device 310, or on any other server or device.

The user may access the ticket server 330 in order to plan a series or collection of events that are to take place over a period for time. For example, a user may be visiting friends in New York City for a weekend, from Thursday the 19$^{th}$ of a particular month to Sunday the 22$^{nd}$ of that month. In order to spend time with friends in New York City, the user may request that the ticket server 330 identify potential events occurring at venues in New York City or in New York City and a surrounding area of radius. In order to spend time with the most friends, the user may request that the ticket server 330 determine which of the potentials events are scheduled such that the most friends could attend the series or collection of events. For example, the user may interface with the ticket server 330 through an app executing on the user's smartphone. The user may indicate that he or she wants to attend a specific number of events (e.g., three events) or a range of events (e.g., three to five events). The user may also interact with the user interface provided by the app in order to specify which friends or contacts with which the user wants to attend the events. The ticket server 330 may access schedule information for the user and for each of the user's friends were contacts and then determine events that are most conducive to the schedules of the user and the user's contacts. This may be done without the user ever knowing the schedules of his or her contacts, and without each of the contacts ever knowing the schedules of the other contacts. In this way, the privacy of individual schedules of the user and the user's contacts may be maintained.

FIGS. 4A and 4B illustrate an exemplary user schedule 400 and an exemplary venue schedule 450, respectively. The exemplary user schedule 400 illustrates one of the many user schedules 335 associate with the user accounts 333 in memory 332 of ticket server 330 illustrated in FIG. 3. In some embodiments, users of the ticket server 330 may affirmatively opt in to a service that shares their schedules with the ticket server 330 to facilitate scheduling of events. For example, the exemplary user schedule 400 may be associated with a first user having a user account on the ticket server 330. The user schedule 400 includes date information, time information, description information, and priority information for a plurality of events. Other embodiments of the user schedule 400 may include other kinds of information for each of the events, meetings, appointments, etc., included in the user schedule 400. The user schedule 400 may be represented in a table or a database having several information fields that characterize a schedule item. For a schedule item 402, the user schedule 400 includes "2015-02-28" in the date field, "14:30:00" in the time field, "00:30:00" in the duration field, "Status Meeting for Project Game-Changer" in the description field, and "1" in the priority field. In other embodiments of the schedule 400, the information contained in the date field, the time field (i.e. a start time field), the duration field, the description field, and/or the priority field may be formatted differently. Additionally, the time field may include an indication of an end time of the schedule item in addition to the start time of the schedule item. The user schedule 400 may be a collection of event items obtained from multiple sources. For example, the schedule item 404 may be acquired by the ticket server 330 from memory 322 of the user device 320, while the schedule item 402 may be obtained from a user's work calendar stored on the schedule server 350 or from past scheduled events not on the current calendar for the user, e.g., the user is generally always has a yoga class from 8:00 a.m. to 9:00 a.m. on Saturdays. User schedule items can also be obtained from social networks, such as a user posting about attending an upcoming event. Thus, schedule information can be inferred from information beyond just the user calendar, such as past user behaviors and patterns and social network postings.

Each user of the ticket server 330 may have a corresponding schedule stored in the user schedules 335 and associated with each of the user accounts in the user accounts 333. Accordingly, when a first user request that the ticket server 330 identify a potential event that the first user wants to attend with one or more contacts having user schedules stored on the ticket server 330, the ticket server 330 may be able to check the availability of the first user and the one or more contacts during the potential event.

FIG. 4B depicts an exemplary event schedule 450 which may be stored among the venue schedules 336 associated with the venue accounts 334 in the memory 332 of the ticket server 330 of FIG. 3. The exemplary venue schedule 450 includes schedule information for a plurality of events scheduled to occur at a particular venue associated with one of the venue accounts on the ticket server 330. For example, the venue may be an athletic arena that hosts athletic events and other events. Accordingly, the venue schedule 450 includes venue schedule items 452, 454, and 456. The schedule item 452 includes "2015-02-28" in a date field, "16:00:00" in a start time field, "21:00:00" in an end time field, "Miami Heat v. LA Lakers" in the description field, "athletic" in a category fields, and "basketball" in a genre field. Other embodiments of the venue schedule 450 may include different fields that describe or characterize events scheduled to occur at the venue associated with the venue schedule 450.

As observed in FIGS. 4A and 4B, conflicts between a user schedule and an event often arise, such as between schedule item 406 on the user schedule 400 and the schedule item 456 on the venue schedule 450. The ticket server 330 is able to assess the conflict and not recommend that the user having the user schedule 400 attend the event identified by the schedule item 456. However, when scheduling multiple events for a group of people, the ticket server 330 may recommend the schedule item 456 to a group of users that includes the user whose schedule includes the schedule item 406, depending on the availability of the others in the group and/or priority values associated with one or more of the people in the group entered by the scheduling user.

When providing recommendations to a user who wants to schedule several events for a group or for multiple groups, the ticket server 330 may identify every member of the group that has an account in the user accounts 333. The ticket server 330 may then access or retrieve the user schedules of each member of the group or groups and compare them with the scheduled event items in the venue schedules 336 in order to determine a collection of events that would be optimal for the group or groups. In some embodiments, this may be done by determining availability from the user schedules in such a way that the only information retrieved is time and availability (e.g., "busy", "tentative", "free", etc.) In this way, privacy of each user may be maintained while providing for the benefits of scheduling, simultaneously, a series or collection of events. For example, the collection of events determined by the ticket server 330 may include the events that would allow the highest number of members of the group or groups to participate, which may referred to as the potential participation. Thus, the ticket server 330 may receive schedule information may a plurality of users and schedule information for a plurality of events and determine a series of events that provides an optimal potential participation.

The optimal potential participation may be determined in several ways, e.g., brute force computation, Monte Carlo sampling, etc. For example, when a user seeks to schedule a plurality of events for a single group of contacts or friends, the optimal potential participation may be determined as the series of events that allow the highest number of people in the group to potentially attend at least one event in the series of events. Such an approach may result in lower attendance to one or more of the events in a collection of events if one contact of the group of contacts has many unique scheduling conflicts. Another approach the ticket server 330 may take to determine the optimal potential participation may be to identify the series of events that results in the highest number of potential attendees at each of the individual or events. Accordingly, potential attendance of a contact may be determined with respect to each individual event in the collection of events or to the collection of events as a whole. The determination by the ticket server 330 may emphasis different ways of determining potential attendance.

In some embodiments, the user accounts 333 of FIG. 3 may include information regarding past attendance of users to a scheduled event. For example, if a particular user frequently accepts scheduled events and the fails to attend, this behavior may be factored into determinations of subsequently scheduled events, e.g., the ticket server 330 or other bulk scheduling device may weight that user's attendance less than other users that are more likely to attend scheduled events. In this way, the recommended schedule of events is more weighted towards those members of the group that are most likely to attend the events. In some embodiments, an additional database of the databases 150 of the network-based system 110 of FIG. 1 may include attendance or participation information for multiple users.

When the user seeks to schedule a plurality of events for multiple groups of contacts and friends, the ticket server 330 may prompt the user to identify which group is to attend which event. For example, the ticket server 330 may provide information to the user device 320 which then renders the information in a user interface with one or more elements provided to facilitate the selection of a group or groups of contacts and to provide information about the desired collection of events. For example, the user may be presented with a user interface that prompts the user to enter a desired number of events and the desired group or groups of contacts the user wants to invite. Additionally, the user may be able to enter information to be used by the ticket server 330 in selecting the events. For example, the user may specify through the user interface that at least one of the events should be a baseball game, another event should be a musical performance, and another event should be a theatrical performance, and that specific groups of contact are intended for each event. The ticket server 330 may receive the specifying information for use in determining a plurality of potential events that satisfy the selections of the user and optimize potential participation of the group or groups the user wants to attend. In some embodiments, the user may be able to specify a specific event, such as the event indicated by the schedule element 452 of the venue schedule 450 of FIG. 4B. The ticket server 330 may then treat the specifically selected event as a fixed event and then determine other events listed in a plurality of venue schedules 336 that will optimize potential participation.

As described herein, the user of the ticket server 330 may specify which group of contacts intended for which particular event. For example, the user may communicate to the ticket server 330, using the user device 320, that the user wants to find an athletic event for a first group of contacts (e.g., work contacts) and a musical performance for a second group of contacts (e.g., social contacts). The ticket server 330 may receive additional parameters for the events from the user. For example, the user may specify that the athletic event to be scheduled for the user's work contacts needs to be held on a specific day and/or time, while the musical performance can occur on multiple days. Accordingly, the user may provide a plurality of constraints to the ticket server 330 corresponding to parameters or characteristics of events that the user wants to be factored into the determination of the collection of potential events by the ticket server 330. Additionally, when determining the collection or series of potential events that optimize potential participation, the ticket server 330 may utilize additional information such as the locations of the venues of the potential events. For example, the ticket server 330 may factor in the time it would likely take the user to move from one venue to another venue so that the ticket server 330 does not provide two or more events in the collection of events that cannot practically be attended together in the series. This can be done without the user knowing the specific location of each event.

Additionally, the ticket server 330 may be provided by the user with varying degrees of priority for one or all of the contacts that may potentially attend an event. For example, the user may indicate that two contacts who are both baseball fans should be given higher priority when the ticket server 330 determines a baseball game to be included in a collection or series of events. The user may also indicate that for a particular event, such as a dinner to celebrate a particular contact's birthday, one or more contacts (such as the contact that is having a birthday) must not have scheduling conflicts. The user may be able to select from multiple priority levels (e.g., three levels or more) associated with each user and/or event. Accordingly, the ticket server 330 may find a dinner event (e.g., an open reservation at a particular restaurant or a particular type of restaurant) that does not conflict according to the schedule information of the one or more contacts, whereas for a sporting event to attend the next day the particular one or more contacts may have a lower than mandatory priority level. In some instances, a priority level of a user may be negative such that the ticket server 330 will be more likely to select an event that conflicts with the specific user's schedule. For example, a user may feel obligation to invite six people for political or personal-relationship reasons, but may not want two of them to actually attend the event. Assigning high priority levels to the other four while assigning the two a negative priority level (e.g., an exclusionary priority level) would result in an event or events being scheduled or recommended that conflict with the schedules of the two to be excluded while permitting the other four people to attend.

In some embodiments, the ticket server 330 may receive information from the user describing a custom event. The custom event may be an event for which the ticket server 330 does not have a corresponding schedule item in the venue schedules 336. The user may want to include the custom event as a fixed event to be factored in by the ticket server 330 when the ticket server 330 determines an optional plurality of potential events. For example, the user may want to host a group of friends at his or her home for a barbecue at a specified time and/or date during a weekend of including other events. The user may provide appropriate information to the ticket server 330, which may then identify other events that do not conflict with the specified time and/or date of the customer event when determining the optimal potential events, including events before and/or after the custom event. In additional embodiments, the user may provide information to the ticket server 330 describing the custom event (e.g., as a dinner, a lunch, or another event) that can be scheduled with some flexibility by the ticket server 330. For example, the user may want to host friends for dinner during a weekend of events, but may want to be flexible about which day of the weekend the user will host the dinner depending on the other available events during the weekend. Accordingly, in some embodiments the ticket server 330 may provide a plurality of series of potential events to the user. Through a user interface, the user may select from among the plurality of series of potential events. The user interface may provide that selection to the ticket server 330.

Additionally, the ticket server 330 may infer an event, a user preference, or priority, etc. based on user actions, behavior, purchases, etc. other than just specific user-set data. For example, if a user checks in at a location with some regularity, such as a gym or coffee house, using a check-in enabling application operating on the user's mobile device, the ticket server 330 may use this check-in information to generate an inferred schedule item. This inferred event may not be represented as schedule item on the user device 320 or in a formal calendar or schedule, but may be included as an inferred schedule item stored on the ticket server 330.

When the user interacts with the ticket server 330 to identify a plurality of potential events, the user may provide a period of time in which the ticket server 330 is to identify events satisfyingly user's criteria and increasing or optimizing potential participation of those that the user intends to invite. For example, the ticket server 330 may receive an indication from the user through the user device 320 that the user wants to identify events occurring on a specific weekend or on specific days. For example, if the user is visiting friends in a city in which the user does not reside for work reasons, the user may want to schedule a plurality of events with the user's friends and contacts that live in and/or that are also schedule to be in that city during the time of the user's trip. In such an instance, the user may want to schedule one or more groups for work related events and one or more groups for social events during that specific weekend or time frame. In some embodiments, the user may provide the ticket server 330 with a period of time that includes a certain amount of flexibility. For example, the user may be interested in scheduling events with several friends or groups of friends on a weekend. The user may not have a specific weekend in mind and may be interested in selecting the weekend based on the availability of the user's contacts and/or the potential events that occurred during each particular weekend. Accordingly, the user may provide information to the ticket server 330 that describes a period of time as including several weekends but not the intervening days between those weekends or as several specifically selected days. Thus, the period of time may not be a continuous period of time, but rather, may be a discontinuous collection of hours, days, weekends, etc., as defined by the user and communicate it to the ticket server 330.

Additionally, embodiments of the present disclosure include a bulk meeting scheduler. For example, in some embodiments the schedule server 350 may be configured to determine an optimal collection of events or times for events for a plurality of users of the schedule server 350. The events may or may not be events that require a ticket for admission. For example, the events scheduled by the bulk meeting scheduler may be work meetings. Rather than finding a time that everyone on a work team can attend a first meeting and then finding the time that everyone can attend a second meeting, etc., a bulk meeting scheduler may receive information from an organizing user that can then be used by the bulk meeting scheduler to determine a schedule of meetings. For example, the organizing user may provide information identifying one or more individuals required to attend the meeting and/or other constraints. As another example, the user may provide that each meeting in the series of meetings should take place during the last week of the calendar month. The user may indicate that a specific meeting in the series of meetings needs to occur at a specific day or during a specific period of time, e.g. a particular week or a particular month. The bulk meeting scheduler may receive this information and determine an overall schedule for the series of meetings that best satisfies the requirements indicated by the organizing user and that factors in the schedules of all those that may attend. The bulk meeting scheduler may be a device similar to the ticket server 330.

Figure 5A:
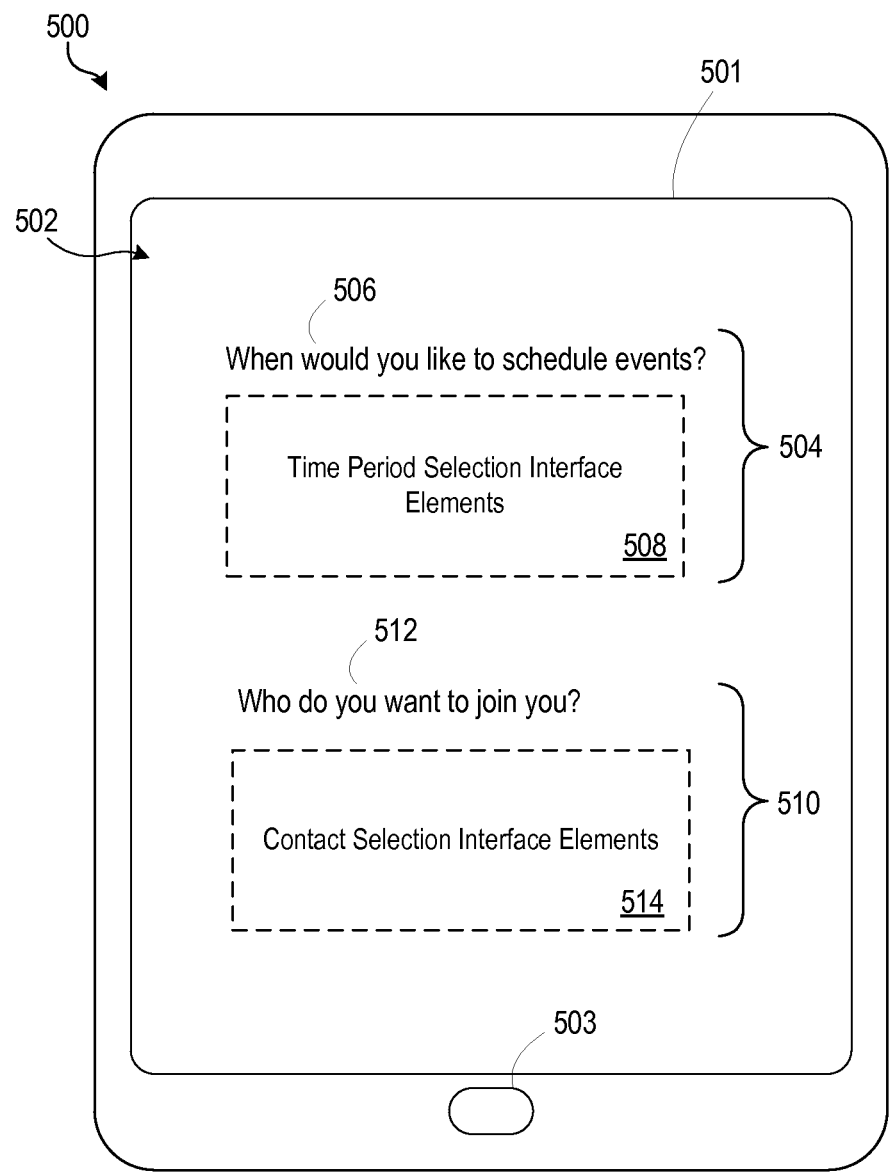
FIG. 5A is a diagram of a mobile device presenting a user interface for scheduling multiple events according to an embodiment.
Figure 5B:
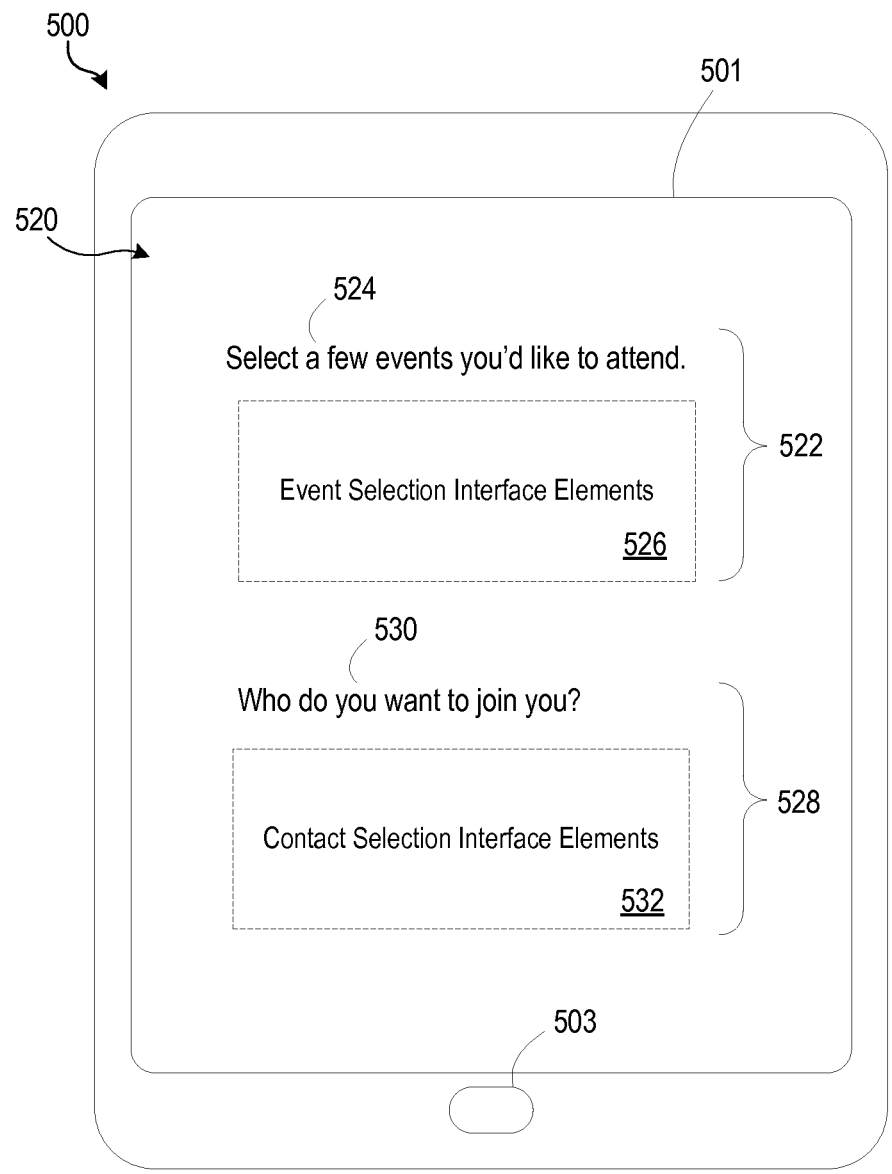
FIG. 5B is a diagram of a mobile device presenting a user interface for scheduling multiple events according to another embodiment.

As shown in FIGS. 5A and 5B, a user may use a mobile device 500 to interact with the ticket server 330 as described herein. The processing device may execute instructions stored on the mobile device 500 to provide information to and collect information from the user through one or more user interfaces rendered to a display 501 of the mobile device 500 as a user interface 502. The user may interact with the user interface 502 by touching the display 501, which may be a touchscreen display, and/or by pressing the button 503. As shown in FIG. 5A, a time period selection interface 504 provides for the transmission of information to the ticket server 330 describing the period of time in which the user wants to schedule several events. As shown in the interface 504, a prompt 506 or other user interface element is provided to solicit such information from the user. User interface 504 further includes one or more time period selection interface elements 508, which may include buttons, sliders, scrolling elements, and other user interface elements by which the user may select a period of time. As described herein, the user may select a continuous period of time or a discontinuous period of time. The user may additionally specify several options that describe a period of time. For example, the user may specify that the ticket server 330 should identify events for each of a plurality of weekends. The ticket server 330 may provide event information from each of the plurality of weekends as options among which the user can then select. When the ticket server 330 provides options for the user's selection, the ticket server 330 may provide a ranking for each option or another indication of the potential participation for each option.

The user interface 502 further includes a contact selection interface 510 that provides for the transmission of information to the ticket server 330 regarding the group or groups of contacts that the user wants to invite to one or more of the series of events. The interface 510 includes a prompt 512 and a collection of contact selection interface elements 514. By manipulating the contact selection interface elements 514, and the user may select one or more contacts and/or one or more groups of contacts the events. In some embodiments, the user interface 502 may provide interface elements by which the user may specify which group of contacts is to attend a specific kind of event and/or which day or at what time the event for each group is to occur.

Referring now to FIG. 5B, shown therein is a user interface 520 rendered to the display 501 of the mobile device 500. The user interface 520 includes an event selection interface 522 which includes a prompt or other indicator 524 to communicate to the user that the user can use the interface 522 to provide information to the ticket server 330 describing the events that the user would like to attend. The event selection interface 522 includes a plurality of event selection interface elements 526. By manipulating one or more of the event selection interface elements 526, the user may provide specific requests to the ticket server 330. For example, the user may manipulate the event selection interface elements 526 to indicate that the user would like to include an athletic event, a musical performance by a specific band (e.g., St. Paul and the Broken Bones), and an unticketed dinner reservation at a Mexican restaurant. The specific requests provided by the user may be broad, such as a musical performance, or maybe narrow enough to specify a genre of music or a specific performer. In this way, the user may request that the ticket server 330 construct a weekend of potential events around a specific event such as a concert or baseball game.

Similar to the interface 510 of FIG. 5A, FIG. 5B includes a contact selection interface 528. The contact selection interface 528 includes a prompt 530 to communicate to the user that the user can manipulate the contact selection interface elements 532 to specify what specific contacts, group, or groups are to be included as potential attendees for the events. The user interface 528 may allow the user to associate a specific group with a specific event requirement or event type. For example, the user may manipulate the user interface 528 to communicate to the ticket server 330 that the user wants group A to attend a rock concert, group B to attend a San Francisco Giants game, and group C to attend an unspecified event. After receiving information regarding the contacts, groups, or groups of contacts that the user wants to attend the events, the ticket server 330 may access corresponding schedule information for each of the contacts, whether individual contacts or contacts within a group. In the event that a contact does not have a user account in the user accounts 333 of the ticket server 330, the ticket server 330 may ignore that contact when determining the plurality of potential events.

In some embodiments of the interfaces 510 and 528, a user may be able to add noncontact individuals to an event or events. For example, the user may anticipate that one or more of the contacts will invite another person to the event. In order to ensure that the ticket server 330 identifies events having sufficient availability, the user may manipulate the contact selection interface elements 514 or 532 to indicate that another ticket may be required for that event. In some embodiments, the contact selection interface 510 or 528 may allow the user to pair a specific contact with a noncontact placeholder. For example, the user may be aware that a specific contact may not attend unless a significant other of that specific contact attends as well. In this way the ticket server 330 may determine that for whatever event or events the specific contact's schedule information indicates availability, and additional ticket may be required.

User interfaces may be provided that include aspects of each of the user interface 504, 510, 522, and 528 and other interfaces. These interfaces may be presented on the display 501 simultaneously or may be presented sequentially.

Figure 6:
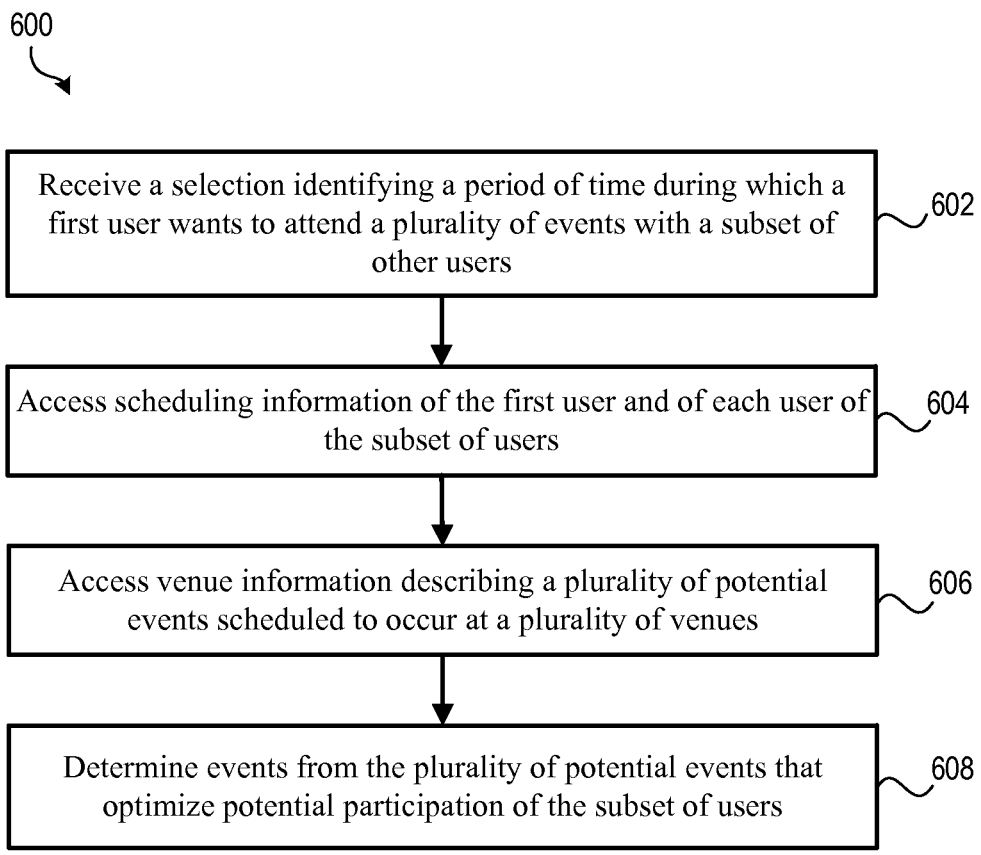
FIG. 6 is a flowchart showing an illustrative process that may be performed for scheduling multiple events according to an embodiment.

Referring now to FIG. 6, shown therein is a flowchart of a method 600 of scheduling a series or collection of events. As illustrated in FIG. 6, the method 600 includes a plurality of enumerated steps or operations. Embodiments of the method 600 may include additional operations before, after, in between, or as part of the enumerated steps. The method 600 may be performed by a bulk meeting scheduler or a ticket server, such as the ticket server 330 of FIG. 3.

Embodiments of the method 600 may begin at step 602, in which a processing device receives a selection identifying a period of time during which a first user wants to attend a plurality of events with a subset of other users. The subset of other users may be contacts or friends of the first user. The first user and at least some of the subset of other users have accounts in the user accounts 333. In some embodiments the selection identifies a continuous period of time, e.g. a particular weekend; while in other embodiments, the selection identifies a discontinuous period of time by which the user may indicate a plurality of optional periods of time. For example, the selection may indicate that the user wants to attend a plurality of events during any weekend within the month of May or any Tuesday in the following six weeks.

At step 604, the processing device access schedule information of the first user and for each of the subset of users. The schedule information may be stored on a single machine that includes the processing device. For example, the processing device may be the processor 331 and the schedule information may be stored on the memory 332 in the user schedules 335. The user schedules may be tables or databases of schedule information like the user schedule 400 of FIG. 4A. In some embodiments, the ticket server 330 may contact a schedule server 350 to request schedule information or updated schedule information associated with a particular user of the ticket server 330. Users of the ticket server 330 may provide login information or another credential to the ticket server 330 for use in accessing their respective user accounts and user schedules in the memory 353 of the schedule server 350. In yet another embodiment, the ticket server 330 may send a communication to user devices associated with the ticket server 330 to request updated schedule information. For example, the ticket server 330 may communicate with an app, like the app 325 executing on the user device 320, to request any schedule information stored on the user device 320.

At step 606, the processing device accesses venue information describing a plurality of potential events scheduled to occur at a plurality of venues. For example, the processor 331 of the ticket server 330 may access the venues schedules 336 stored in the memory 332. Additionally, the ticket server 330 may communicate with one or more venue servers 310 to access venue information. The venue information may be a table or database like the venue schedule 450 of the FIG. 4B.

At step 608, the processing device determines events from the plurality of potential events that optimize potential participation of the subset of users. For example, the ticket server 330 may use the venue schedules 336 and the user schedules 335 corresponding to the contacts of the user that the user indicates as potential attendees to determine a series of events that will allow the highest number of the subset of users to attend at least one event in the series of events. In some embodiments, the ticket server 330 may determine the series of events that will allow the highest number of attendances to the overall series of events, regardless of whether a particular individual is unable to attend any of the events. In some embodiments, the ticket server 330 may use a combination of factors such as total potential attendance to the series and total potential attendees to the series. Additionally, the user may provide the ticket server 330 with weighting information, such that the participation of a particular user of the subset of users is required for a particular event. For example, the user may indicate that a baseball game should only be scheduled if or when a particular contact that is a baseball fanatic can potentially attend. The ticket server 330 may include degrees of weighting at the instruction of the first user, such that the potential attendance of a particular contact may count more or less than the potential attendance of another contact. In some embodiments, the weighting associated with the potential attendance of a contact may depend on the event.

After determining events that optimize or maximize the potential participation of a subset of users, whether a single group specified by the first user or multiple groups, the processing device may communicate information characterizing the events to a user device of the first user. For example, the ticket server 330 may provide multiple "packages" or groups of events that satisfy requirements of the first user and that ensure that potential attendance is higher than random. As described herein optimizing potential participation may not mean that an absolute, optimal collection of events is determined Several possible combinations of events may provide the same potential participation or attendance value. Thus, several possible combinations of events may be present to the first user for selection by the first user. In some embodiments, the first user may communicate the possible combinations to first user's contacts so that the group may collectively decide on the customized collection of events. The ticket server 330 may also provide price information associated with each collection of events to the first user for user in selecting a particular collection. In some embodiments, a user interface may enable the first user to select a price limit on the collection of events and/or on individual events. Thus, the ticket server 330 may only search the venue schedules 336 for events having tickets below a price threshold.

According to some embodiments, a computer program product can comprise a non-transitory machine-readable medium. The non-transitory machine readable medium can store computer-readable and executable code for instructing one or more processors to perform the method 600 and/or other disclosed herein.

The systems and methods described herein permit a user to plan of series of events in which the selection of one event in the series automatically has an effect on characteristics of the second series. The systems and methods described herein operate in an Internet-centric environment to overcome the problem of scheduling multiple events simultaneously over the Internet. Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system for scheduling events for a plurality of users, the system comprising:
   a non-transitory memory; and
   one or more hardware processors in communication with the non-transitory memory and configured to read instructions from the non-transitory memory to cause the system to perform operations comprising:
      providing, on a first user device associated with a first user, a graphical user interface (GUI) for organizing one or more events, wherein the GUI includes a first user interactive tool that enables the first user to indicate a time period for the one or more events and a second user interactive tool that enables the first user to select a plurality of potential participants for the one or more events;
      determining, based on a first user interaction with the first user interactive tool, an indication of a first time period for the one or more events;
      determining, based on a second user interaction with the second user interactive tool, a selection of the plurality of potential participants for the one or more events;
      obtaining, for each potential participant in the plurality of potential participants, recorded location sensor data and check-in data from a user device associated with the potential participant to derive past activity behavior information for the potential participant;
      determining, for each potential participant in the plurality of potential participants, schedule information by performing at least two of: (i) accessing a calendar application of a user device associated with the potential participant via an application programming interface (API) of the calendar application, (ii) retrieving data associated with a user account of the potential participant from a schedule server, or (iii) inferring schedule data based on the derived past activity behavior information of the potential participant and postings on a social networking server generated by an account associated with the potential participant;
      accessing attendance history of the plurality of potential participants at previous events organized by the first user;
      inferring an interest for the first user based on past activity behavior information of the first user obtained from the first user device associated with the first user;
      determining, for each potential participant in the plurality of potential participants, a priority level based on the attendance history of the potential participant;
      retrieving, over a network, schedule information associated with a plurality of potential events occurred within the first time period;
      determining at least two events from the plurality of potential events that optimize weighted potential participations of the plurality of potential participants based on the priority levels, the schedule information of the plurality of potential participants, the schedule information associated with the plurality of potential events, and the inferred interest of the first user; and
      providing, through the GUI, a third user interactive tool that enables the first user to select participants from the plurality of potential participants to attend each of the at least two events.

2. The system of claim 1, wherein the operations further comprise:
   accessing venue information from a plurality of venue servers associated with a set of potential events;
   providing, on the GUI displayed on the first user device, events information characterizing the set of potential events, wherein the events information characterizing the set of potential events comprises the accessed venue information; and
   receiving, on the GUI, a selection of the plurality of potential events by the first user from the set of potential events.

3. The system of claim 1, wherein the operations further comprise accessing schedule information associated with a second plurality of potential participants, and wherein the plurality of potential participants and the second plurality of potential participants are contacts of the first user on the first user device.

4. The system of claim 3, wherein the operations further comprise receiving a first selection of a first event from the at least two events for the plurality of potential participants and a second selection of a second event from the plurality of potential events for the second plurality of potential participants.

5. The system of claim 3, wherein the operations further comprise determining at least one event from the plurality of potential events that optimize potential participation by the second plurality of potential participants based on the accessed schedule of the second plurality of potential participants.

6. The system of claim 1, wherein the weighted potential participation of the plurality of potential participants is further based on an event type.

7. The system of claim 1, wherein the operations further comprise:
   inferring event preferences of the plurality of potential participants based on online activities of the plurality of potential participants; and
   selecting the plurality of potential events from a set of potential events based on the inferred event preferences.

8. The system of claim 1, wherein a first potential participant in plurality of potential participants has a higher priority level than a priority level of a second potential participant of the plurality of potential participants when the attendance history indicates that the first potential participant has attended more previous events organized by the first user than the second potential participant.

9. A method for scheduling events for a plurality of users, the method comprising:
providing, by one or more hardware processors on a first user device associated with a first user, a graphical user interface (GUI) for organizing one or more events, wherein the GUI includes a first user interactive tool that enables the first user to indicate a time for the one or more events and a second user interactive tool that enables the first user to select a plurality of potential participants for the one or more events;
determining, by the one or more hardware processors based on a first user interaction with the first user interactive tool, an indication of a first time period for the one or more events;
determining, by one or more hardware processors based on a second user interaction with the second user interactive tool, a selection of the plurality of potential participants for participating in the one or more events;
obtaining, by the one or more hardware processors for each potential participant in the plurality of potential participants, recorded location sensor data from a user device associated with the potential participant;
deriving, by the one or more hardware processors, past activity behavior information for each potential participant based on the recorded location sensor data;
determining, by the one or more hardware processors for each potential participant in the plurality of potential participants, schedule information by performing at least two of (i) accessing a calendar application of a user device associated with the potential participant via an application programming interface (API) of the calendar application, (ii) retrieving data associated with a user account of the potential participant from a schedule server, or (iii) inferring schedule data based on the derived past activity behavior information of the potential participant and postings on a social networking server generated by an account associated with the potential participant;
accessing, by the one or more hardware processors, attendance history of the plurality of potential participants at previous events organized by the first user;
inferring, by the one or more hardware processors, an interest for the first user based on past activity behavior information of the first user obtained from the first user device associated with the first user;
determining, by the one or more hardware processors for each potential participant in the plurality of potential participants, a priority level based on the attendance history of the potential participant;
retrieving, by the one or more hardware processors over the network, schedule information associated with a plurality of potential events occurred within the first time period;
determining, by the one or more hardware processors, at least two events from the plurality of potential events that optimize weighted potential participations of the plurality of potential participants based on the determined priority levels, the schedule information of the plurality of potential participants, the schedule information associated with the plurality of potential events, and the inferred interest of the first user; and
providing, by the one or more hardware processors through the GUI, a third user interactive tool that enables the first user to select participants from the plurality of potential participants to attend each of the at least two events.

10. The method of claim 9, further comprising:
determining, based on a third user interaction with the third user interactive tool, a first group of potential participants selected from the plurality of potential participants for attending a first event from the at least two events, wherein the first event is of a first event type; and
determining, based on a fourth user interaction with the third user interactive tool, a second group of potential participants selected from the plurality of potential participants for attending a second event from the at least two events, wherein the second event is of a second event type.

11. The method of claim 9, further comprising communicating, to the first user device over the network, event schedule information associated with the plurality of events.

12. The method of claim 9, further comprising receiving a selection from the first user device of an event to be included in the plurality of potential events.

13. The method of claim 10, further comprising inferring event preferences of the plurality of potential participants based on online activities of the plurality of potential participants, wherein the first event is determined based on the inferred event preferences of the first group of potential participants and the second event is determined based on the inferred event preferences of the second group of potential participants.

14. A non-transitory machine readable medium having stored thereon machine-readable instructions executable to cause the machine to perform operations comprising:
providing, on a first user device associated with a first user, a graphical user interface (GUI) for organizing one or more events, wherein the GUI includes a first user interactive tool that enables the first user to indicate a time period for the one or more events and a second user interactive tool that enables the first user to select a plurality of potential participants for the one or more events;
determining, based on a first user interaction with the first user interactive tool, an indication of a first time period for the one or more events;
determining, based on a second user interaction with the second user interactive tool, a selection of the plurality of potential participants for the one or more events;
obtaining, for each potential participant in the plurality of potential participants, recorded location sensor data and check-in data from a user device associated with the potential participant to derive past activity behavior information for the potential participant;
determining, for each potential participant in the plurality of potential participants, schedule information by performing at least two of (i) accessing a calendar application of a user device associated with the potential participant via an application programming interface (API) of the calendar application, (ii) retrieving data associated with a user account of the potential participant from a schedule server, or (iii) inferring schedule data based on the derived past activity behavior information of the potential participant and postings on a social networking server generated by an account associated with the potential participant;
accessing attendance history of the plurality of potential participants at previous events organized by the first user;

inferring an interest for the first user based on the past activity behavior information of the first user obtained from the first user device associated with the first user;

determining, for each potential participant in the plurality of potential participants, a priority level based on the attendance history of the potential participant;

retrieving, over a network, schedule information associated with a plurality of potential events occurred within the first time period;

determining at least two events from the plurality of potential events that optimize weighted potential participations of the plurality of potential participants based on the priority levels, the schedule information of the plurality of potential participants, the schedule information associated with the plurality of potential events, and the inferred interest of the first user; and providing, through the GUI, a third user interactive tool that enables the first user to select participants from the plurality of potential participants to attend each of the at least two events.

15. The non-transitory machine readable medium of claim 14, wherein the operations further comprise:

accessing venue information from a plurality of venue servers associated with a set of potential events; and communicating events information characterizing the set of potential events to the first user device, wherein the events information characterizing the set of potential events comprises the accessed venue information, and wherein the plurality of potential events are selected by the first user from the set of potential events.

16. The non-transitory machine readable medium of claim 14, wherein the operations further comprise accessing schedule information associated with a second plurality of potential participants, and wherein the plurality of potential participants and the second plurality of potential participants are contacts of the first user on the first user device.

17. The non-transitory machine readable medium of claim 14, wherein the operations further comprise:

receiving, via the third user interactive tool, a first selection of a first group of participants from the plurality of potential participants for attending a first event from the at least two events; and receiving, via the third user interactive tool, a second selection from the first user regarding of a second group of participants from the plurality of potential participants for attending a second event from the at least two events.

18. The non-transitory machine readable medium of claim 16, wherein the operations further comprise determining at least one event from the plurality of potential events that optimize potential participation by the second plurality of potential participants based on the accessed schedule of the second plurality of potential participants.

19. The non-transitory machine readable medium of claim 14, wherein the weighted potential participation of a potential participant is further based on an event type.

20. The non-transitory machine readable medium of claim 14, wherein the operations further comprise:

inferring event preferences of the plurality of potential participants based on online activities of the plurality of potential participants; and selecting the plurality of potential events from a set of potential events based on the inferred event preferences.

* * * * *